(12) United States Patent
Bender et al.

(10) Patent No.: US 11,485,097 B2
(45) Date of Patent: Nov. 1, 2022

(54) SYSTEM AND METHOD FOR BENDING TOWPREG

(71) Applicant: Arris Composites Inc., Berkeley, CA (US)

(72) Inventors: Christopher Bender, Oakland, CA (US); Erick Davidson, Piedmont, CA (US); Ethan Escowitz, Berkeley, CA (US); Alexander Darrow, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/331,270

(22) Filed: May 26, 2021

(65) Prior Publication Data
US 2022/0161509 A1   May 26, 2022

Related U.S. Application Data (60) Provisional application No. 63/031,535, filed on May 28, 2020.

(51) Int. Cl.
*B29C 70/34* (2006.01)
*B29B 11/12* (2006.01)
(Continued)

(52) U.S. Cl.
CPC .......... *B29C 70/345* (2013.01); *B29B 11/12* (2013.01); *B29C 43/34* (2013.01); *B29C 43/52* (2013.01);
(Continued)

(58) Field of Classification Search
CPC ....... B29C 70/345; B29C 43/34; B29C 43/52; B29C 2043/3255; B29C 2043/3411;
(Continued)

(56) References Cited

U.S. PATENT DOCUMENTS

| 2018/0345604 A1 | 12/2018 | Escowitz | |
| 2018/0345605 A1* | 12/2018 | Escowitz | .............. B29C 31/085 |

(Continued)

FOREIGN PATENT DOCUMENTS

| CN | 106863766 | * | 6/2017 | ............. B29C 53/02 |
| GB | 2533567 | * | 6/2016 | ............. B29C 70/30 |

OTHER PUBLICATIONS

International Search Report and Written Opinion dated Jan. 7, 2022 issued in PCT Patent Application No. PCT/US2021/034324.

*Primary Examiner* — Jeffrey M Wollschlager
*Assistant Examiner* — Shibin Liang
(74) *Attorney, Agent, or Firm* — Kaplan Breyer Schwarz, LLP (57) ABSTRACT

A method for bending towpreg to yield a desired amount of axial force during bending to form a preform is provided including inserting towpreg into a bending die, applying an initial axial force to the towpreg, and moving the gripped end of the towpreg in an involute path using a cam, a cam follower and a gripper, the gripper disposed on the cam follower. Axial force between the gripped end and the stationary end of the towpreg from a point where the towpreg contacts a surface of the bending die is applied tangent to the surface of the bending die while bending the towpreg. An apparatus for bending towpreg to form a preform is provided including bending dies disposed in fixed positions, and a follower. Axial involute cam mechanism having a drive shaft, a cam, a cam follower that follows an involute path around the cam, a gripper and a clamp.

9 Claims, 5 Drawing Sheets

(51) Int. Cl.
  *B29C 43/34* (2006.01)
  *B29C 43/52* (2006.01)
  *B29C 43/32* (2006.01)

(52) U.S. Cl.
  CPC ............... *B29C 2043/3255* (2013.01); *B29C 2043/3411* (2013.01)

(58) Field of Classification Search
  CPC ......... B29C 70/56; B29C 70/30; B29C 70/28; B29C 53/02; B29C 70/40; B29C 70/32; B29B 11/12; B29B 11/16
  See application file for complete search history.

(56) References Cited

U.S. PATENT DOCUMENTS

2019/0322041 A1* 10/2019 Manuel ................ B29C 64/209
2020/0114596 A1   4/2020 Davidson et al.
2020/0171763 A1   6/2020 Escowitz et al.

* cited by examiner

SYSTEM AND METHOD FOR BENDING TOWPREG

CROSS-REFERENCE TO RELATED APPLICATION

This application claims priority to U.S. Provisional Patent Application Ser. No. 61/031,535, filed on May 28, 2020, entitled System and Method for Bending Towpreg.

BACKGROUND OF THE INVENTION

The present invention relates to fiber-composite parts. More particularly, the present invention relates to processing of fiber-composite parts.

A fiber composite part includes fibers that are dispersed within a matrix. The matrix, which is a polymer resin, surrounds and supports the fibers by maintaining their relative positions in addition to preventing the fibers from abrasion and environmental attack. The fibers impart their mechanical and physical properties to enhance those of the matrix. The combination is synergistic; the composite possesses material properties unavailable from the individual constituents, such as an exceptionally high strength-to-weight ratio.

A fiber-composite part exhibits anisotropic behavior. Such a part exhibits best achievable mechanical properties for a given part geometry when the fibers therein are aligned with the direction of principal stress everywhere throughout the part per the anticipated loading conditions. For example, such a part will have a higher strength and stiffness than a part in which fibers are unidirectionally aligned.

Optimally arranging fibers during manufacturing is typically not possible, and certainly not practical, with prior-art methods. Specifically, since the fibers within the tapes or fabric typically used to make such parts are fixed in one (tape) or two (fabric) directions, any such directional "optimization" is usually limited to offsetting successive layers of the tape/fabric by standard offsets, such as +/− increments of 30°, 45°, etc.

Applicant has taught the use of fiber-bundle-based preforms for creating fiber-composite parts. Such preforms may be formed from segments of towpreg, wherein the towpreg is cut to a desired size and bent into a desired shape. These fiber-bundle-based preforms provide an unparalleled ability to align fibers with the anticipated principal stress vectors within a part.

However, obtaining a desired bend angle, etc., in a length of towpreg can be problematic.

SUMMARY OF THE INVENTION

In the towpreg preforming process for fabricating fiber composite parts, maintaining tension while bending is desirable to achieving a repeatable and consistent bend angle. The benefit of tension is attributable to the fact that constituent fibers of the relevant towpreg must remain taught while the resin is viscous (e.g., brought above the glass transition temperature). Absent any tension while the matrix is viscous, the fibers can deform unpredictably during the bend process, resulting in undesirable fiber alignment in the bent region. U.S. Patent Publication Nos. 2018/0345604 (Escowitz) and 2018/0345605 (Escowitz), as well U.S. Patent Publication No. 2020/00171763 (Escowitz), owned by the present applicant, all teach preforming towpreg.

as the specifications of which are fully incorporated by reference hereto,

The present invention is directed to preforming towpreg into desired shapes utilizing an apparatus for bending towpreg that utilizes an involute path about a bending die. The involute path is determined to be an ideal path for maintaining tension via a preforming end effector (i.e., towpreg grippers). An involute path ensures that the towpreg is always under constant force tangent to the bending die surface where the towpreg is in contact with the bending die surface. Further, such geometry also maintains constant contact between the towpreg and the heated surface of the bending die through the entire range of motion, a property commonly used in the meshing of gear teeth.

An involute rotational path during bending may be achieved, for example, via the complex motion of a programmable three-axis SCARA (Selective Compliance Assembly Robot Arm). While effective, a SCARA robot may be cost prohibitive in a typical environment for bending towpreg. Prior to the use of a SCARA, prior art apparatus for bending towpreg did not follow an involute curve, and thus suffered bend quality issues (e.g., buckling out of plane). Rather, its rotation was configured to follow a path of constant radius. Its center of rotation was situated relative to the rotational center of the bending die such that undesirable effects were minimized to the extent possible, yet still present. Although cost effective, bend quality issues are thus unavoidable with such radial rotation due to a lack of constant tension at all bend angles. The present invention is a cost-effective means of applying tension and maintaining alignment to towpreg during the bending process.

An additional critical feature of the towpreg preforming process is ensuring the preforming end effector (e.g., towpreg grippers) is aligned with the axis of the tow. If during the bending the end effector becomes misaligned with the segment of tow that it is gripping, the end effector can introduce an undesirable kink in a segment of the towpreg. On prior art preformers, the end effector is aligned prior to bending, and as the end effector rotates to make a bend, by the nature of the geometry, the end effector becomes misaligned with the axis of the segment of the towpreg it is gripping. Using a SCARA, the orientation of the end effector may be controlled to ensure the end effector is aligned with the tow during the entire bend, but, again, does so at prohibitive cost. The present invention addresses the challenge of maintaining alignment between the bending end effector and the towpreg axis while the end effector follows an involute path to make a bend, in a system having a substantially reduced cost as compared to a system using a SCARA. It is estimated that such a mechanism is at least an order of magnitude less expensive than a SCARA mechanism, yet capable of achieving equivalent bend quality.

Design of a novel, effective, and cost-efficient mechanical method to create an apparatus for preform bending having an involute path is disclosed herein. The present invention consists of an end effector mounted to a dual-follower rotary cam system, the cam geometry providing an involute path along which the end effector moves during rotation. While the end effector translates, the end effector also rotates to maintain alignment with the axis of the towpreg being processed. Simultaneous translation and rotation is resultant from the involute cam follower mechanism.

The involute cam geometry is determined by the radius of the associated bending die, the towpreg diameter, and an additional adjustment that results in a path for the followers that provides the necessary translational displacement for tensioning towpreg. As the end effector assembly rotates, the radial distance from the grip point to the die rotational center displaces by means of the involute cam path. Thus, constant, increased or decreased axial force, as desired, and alignment can be maintained on the towpreg at all angles during the bending process.

A method for bending towpreg to maintain a desired amount of tension during bending to form a preform is provided, including inserting a towpreg into a bending die, the towpreg having a fixed, stationary end and a gripped end, the bending die having a bending die surface, applying an initial axial force to the towpreg, and moving the gripped end of the towpreg in an involute path using a cam, a cam follower and a gripper, the gripper disposed on the cam follower. The axial force to the towpreg between the gripped end and the stationary end of the towpreg from a point where the towpreg contacts a surface of the bending die is applied tangent to the surface of the bending die while bending the towpreg.

The step of moving the gripped end of the towpreg may include gripping, by an end effector, the gripped end of the towpreg. The end effector may have a grip axis and the towpreg has a longitudinal axis, wherein alignment of the grip axis and the longitudinal axis of the towpreg is maintained during bending. A step of applying heat to the towpreg may be provided.

An apparatus for bending towpreg is also provided. The apparatus includes at least one bending die disposed in a fixed position and an involute cam mechanism. The involute cam mechanism includes a drive shaft rotatable about a drive shaft axis, a cam disposed on the drive shaft, the cam having a cam surface, and at least one cam follower following an involute cam path around the cam. The cam follower is biased against the cam by a biasing member. The cam surface provides for movement of the cam follower in an involute path. A gripper is disposed on the cam follower for gripping a first end of the towpreg. A clamp is provided for fixing a second end of the towpreg adjacent to the bending die, which is fixed relative to the first end of the towpreg.

The follower may be dual followers. The bending die may be heated. The biasing member may be a spring. The axial force may be a tensile force. The axial force may increase, decrease or remain constant during bending. The axial force may be a compressive force.

BRIEF DESCRIPTION OF THE DRAWINGS

The invention will be described in conjunction with the following drawings in which like reference numerals designate like elements and wherein.

DETAILED DESCRIPTION

The following terms, and their inflected forms, are defined for use in this disclosure and the appended claims as follows:

"Involute path" means a curved path defined by the locus of a point on a piece of taut string as the string is either unwrapped from or wrapped around the circle. That is, the curve for which all the normals are tangent to the fixed circle. It is the curve traced by a hand unwinding a wire reel held in the other hand.

"Preform" means a bundle of plural, unidirectionally aligned, same-length, resin-wetted fibers. The bundle is often (but not necessarily) sourced from a long length of towpreg. That is, the bundle is a segment of towpreg that has been cut to a desired size and, in many cases, is shaped (e.g., bent, twisted, etc.) to a specific form, as appropriate for the specific part being molded. The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. Applicant's use of the term "preform" means a fiber-bundle-based preform, and explicitly excludes any size of shaped pieces of: (i) tape (typically having an aspect ratio—cross section, as above—of between about 10 to about 30), (ii) sheets of fiber, and (iii) laminates.

"Tow" means an untwisted and unidirectional bundle of continuous fiber. The term "bundle" is used herein synonymously with the terms roving and tow. Tows usually contain multiples of 1000 fibers, such as a 1K tow (1000 fibers), a 12K tow (12,000 fibers), a 24K tow (24,000 fibers), etc.

"Towpreg" means a fiber bundle (i.e., a tow) that is impregnated with resin.

"About" or "Substantially" means+/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Figure 1:
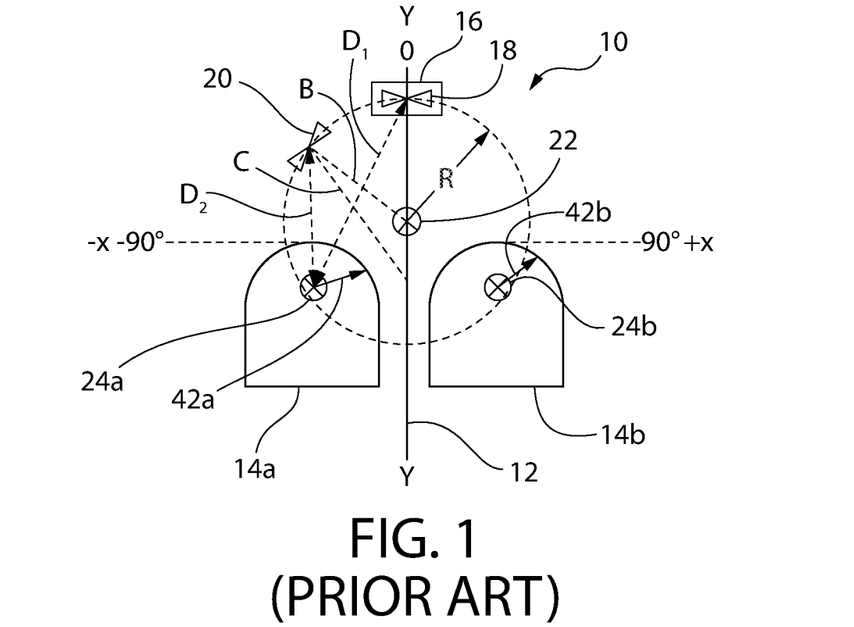
FIG. 1 is a simplified plan view of a prior art apparatus for bending towpreg.

Referring now to the drawing figures wherein like reference numbers refer to like elements throughout the several views, there is shown in FIG. 1 a prior art bending apparatus 10 that depicts a segment of towpreg 12 being processed. The towpreg 12 is shown mounted in a bending die (including left bending die 14a and right bending die 14b) of the bending apparatus 10. The prior art bending apparatus 10 includes an end effector 16 having a grip point 18. Relative positions of the end effector grip point 18, rotational path 20 of the grip point 18, end effector center of rotation 22, and die 14a, 14b centers of rotation 24a, 24b are also shown. The feed axis Y--Y of the towpreg 12 can be considered a bend angle of zero degrees, with +/−ninety degree bends represented by the axis −X--+X. It should be noted that the end effector center of rotation 22 is coincident with neither the left bending die 14a nor the right bending die 14b centers of rotation 24a, 24b. Further, the radius R of the rotational path 20 of the grip point 18 remains constant.

To preform all relevant shapes, the bending apparatus 10 for towpreg 12 must bend in both the positive and negative ranges of angles, as shown in FIG. 1. This necessity mandates the lack of coincidence between the end effector center of rotation 22 and the die centers of rotation 24a, 24b, assuming that the end effector center of rotation 22 is fixed (i.e., does not translate to coincide with the die centers of rotation 24a, 24b). For reasons of mechanical precision and bend accuracy in both bend directions (−X, +X), it is advantageous to keep the end effector center of rotation 22 as a fixed point relative to the bending dies 14a, 14b.

Given the lack of coincidence in centers of rotation 22, 24a, 24b, the towpreg 12 is not tensioned during bending. In such a bending apparatus 10, this negative effect worsens as the bend angle increases, since the radial distance from the grip point 18 to the die center of rotation changes accordingly (compare length $D_1$ to length $D_2$). This dynamic radial change between the grip point and die center causes buckling in the viscous bend region of the towpreg 12 through a lack of tension.

Maintaining a precisely located end effector center of rotation 22, while simultaneously maintaining the necessary distances and alignments between the grip point 18 and die 14a center of rotation 24a and grip point 18 and die 14b center of rotation 24b to apply tension, therefore, cannot be achieved through rotation having a constant radius.

Figure 2:
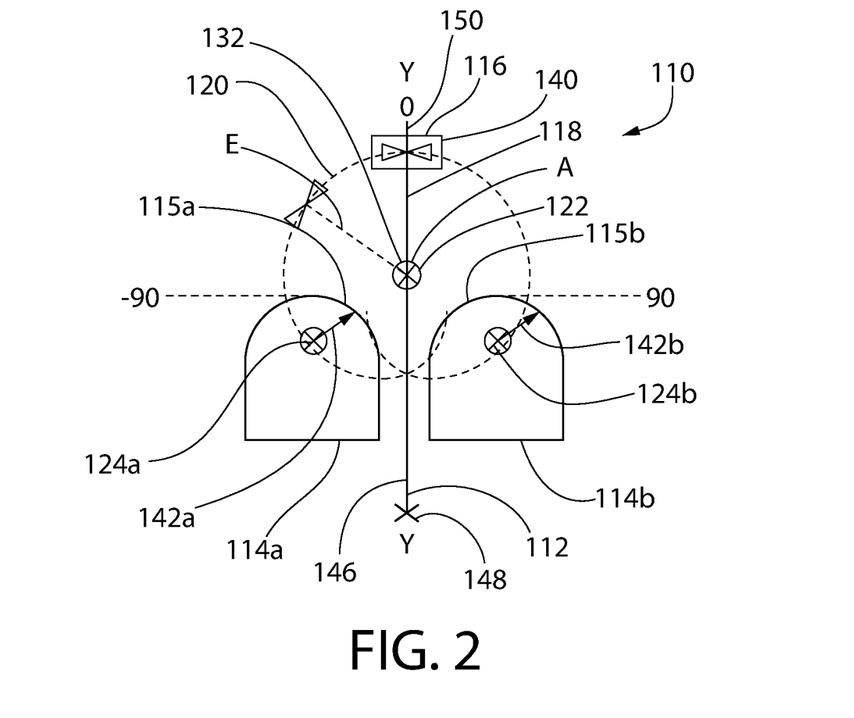
FIG. 2 is a simplified plan view of an apparatus for bending towpreg in accordance with an exemplary embodiment of the present invention.
Figure 2A:
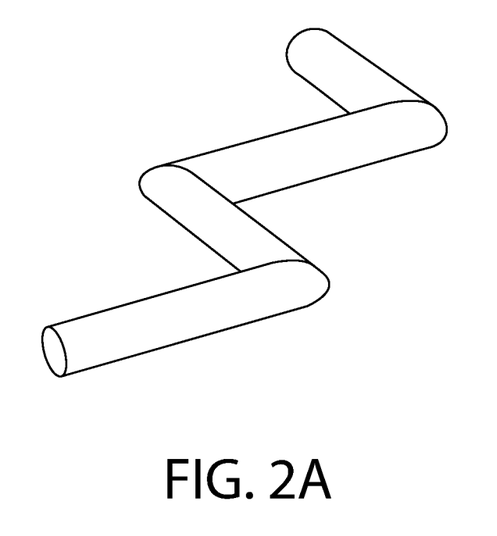
FIG. 2A is one example of a preform that may be formed with the apparatus for bending of FIG. 2.
Figure 3:
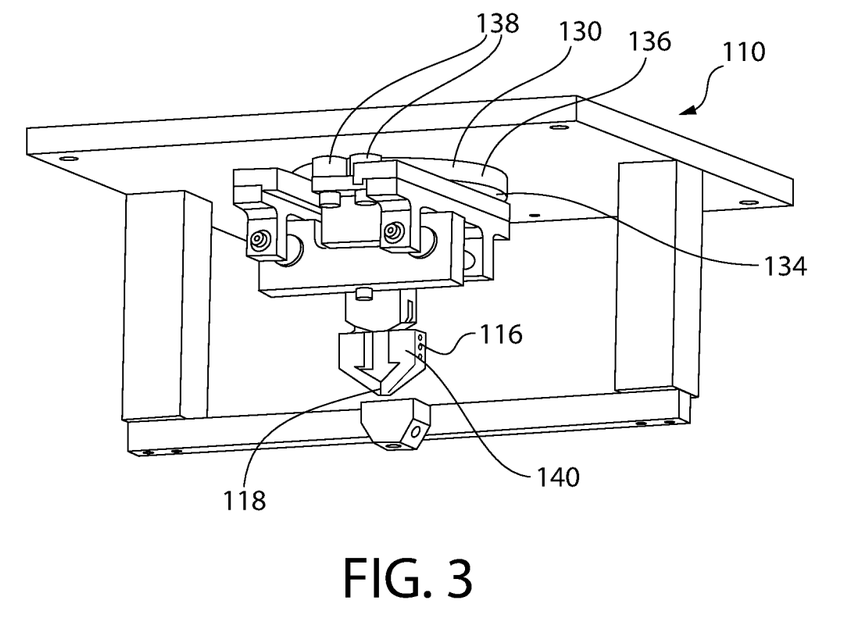
FIG. 3 is an isometric view of the apparatus for bending towpreg of FIG. 2.
Figure 4:
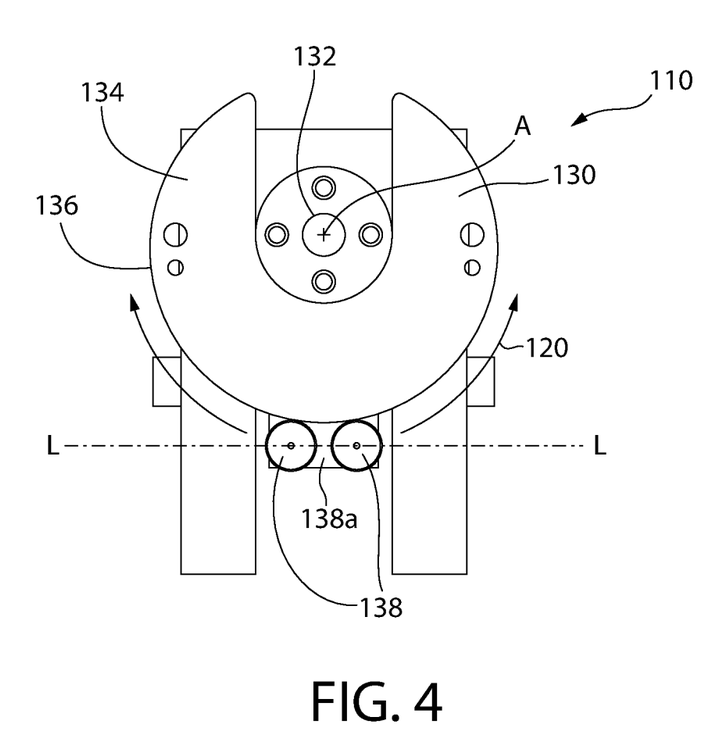
FIG. 4 is a partial top, plan view of the apparatus for bending towpreg of FIG. 2.
Figure 5:
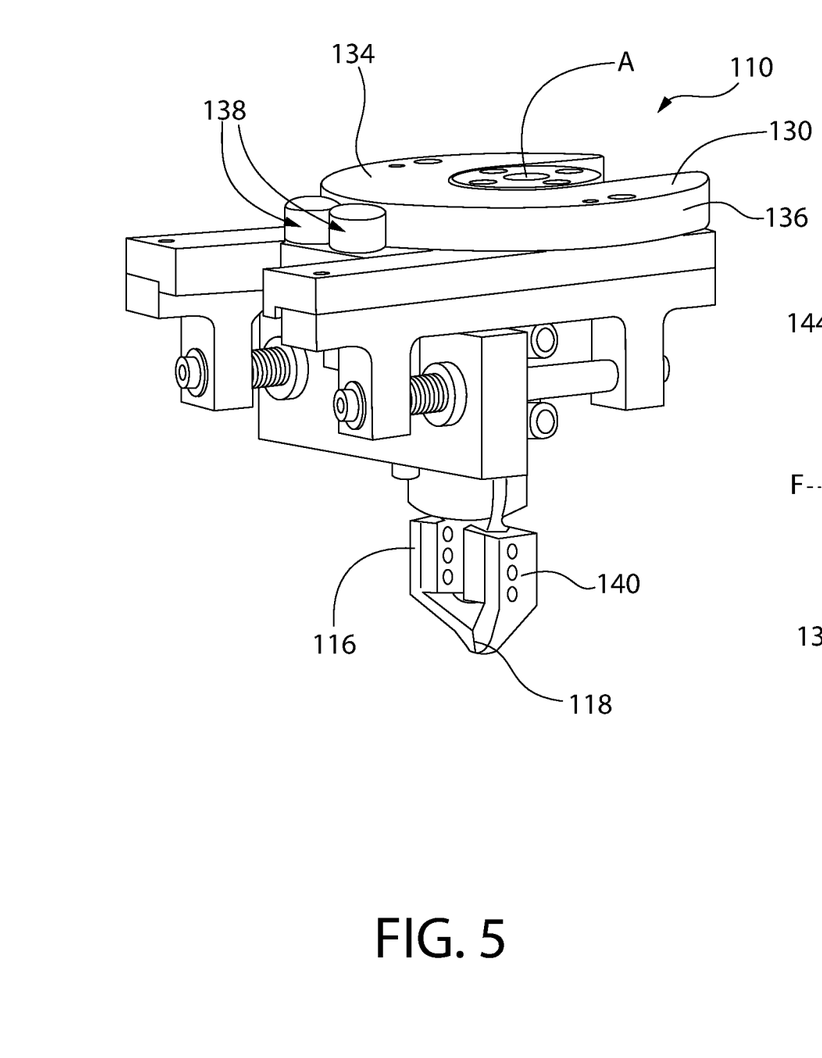
FIG. 5 is another partial isometric view of the apparatus for bending towpreg of FIG. 2.

Referring now to FIGS. 2 and 3-6, there is shown a bending apparatus 110 in accordance with an exemplary embodiment of the present invention. An example of a preform made with the bending apparatus 110 is depicted in FIG. 2A. The bending apparatus 110 includes an involute cam mechanism 130 (see FIGS. 3-6) that includes a drive shaft 132 (rotatable about drive shaft axis A) and a cam 134 disposed on the drive shaft 132. The cam 134 has a cam surface 136 upon which one or more cam followers 138 follows an involute path 120. A gripper 140 (having grip axis 118) is disposed on the cam follower 138 such that the gripper 140 moves in the involute path 120 of the cam follower 138. The cam follower 138 is biased against the cam surface 136 of the cam 134. A pair of bending dies 114a, 114b, preferably heated as known in the prior art, is disposed adjacent to the cam mechanism 130. Towpreg 112 is secured in the bending apparatus 110 by the clamp 148 at a first end 146 of the towpreg 112 and the gripper 140 at a second end 150 of the towpreg 112 adjacent to the bending dies 114a, 114b. The bending dies 114a, 114b have bending die surfaces 115a, 115b.

In the bending apparatus 110, the involute path 120 of gripper 140 is determined to be superior to the constant radial path 20 of the prior art bending apparatus 10 of FIG. 1 for producing quality bends in tow pregs 112 having a given level of complexity (i.e., having positive and negative bend angles).

The involution of the cam 134 is specified to maintain the appropriate distance between the gripper 140 and bending die 114a or 114b centers of rotation 124a or 124b during rotation of the cam 134, with a displacement necessary to properly tension the bending towpreg 112. If the involution is too small, the towpreg 112 will not be adequately tensioned while the matrix of the towpreg 112 is viscous. Inversely, too large of an involution will apply inordinate tension that risks misforming the viscous towpreg 112 against the die surfaces 115a, 115b, or causing slippage between the towpreg 112 and the gripper 140.

The amount of grip point displacement (see FIG. 2) resultant from the involute path 120 is a function of the bend radius 142a or 142b present in the associated die 114a or 114b, in addition to diameter of the towpreg 112. A larger radius 142a, 142b, for example, requires more displacement due to the involute path being derived from a larger radius. Varying the radii 142a or 142b of the bending die 114a or 114b thus requires a concomitant varying of the involute cam 134.

Another challenge with the basic, constant bending radius apparatus of the prior art bending apparatus 10 of FIG. 1 are kinks that can be introduced into the towpreg 12 due to a misalignment between the end effector 16 and its grip axis 118 and towpreg 12 axis Y--Y of the tow segment being gripped. As the end effector 16 rotates, it is always facing the end effector center of rotation 22. However, the axis of the bent section of towpreg 12 is along a path that is tangent to the bending die radius 42a, 42b. Therefore, during bending, the end effector 16 is misaligned from the bent towpreg segment's major axis by an angle equal to the angle between the bent towpreg axis C and the radial line B between the end effector and the end effector center of rotation. This misalignment angle can cause a kink in the towpreg 12.

The bending apparatus 110 of the present invention addresses this misalignment between end effector 116 and the towpreg axis. The involute curve has an inherent property that a line normal to the involute curve is tangent to the circle that the involute curve is derived from. Since the involute cam surface 136 of the cam 134 is derived from the bending die radius 142a, 142b, any line normal to the involute curve is necessarily tangent to the bending die surface 115a, 115b. Therefore, these normal lines are coincident with the bent towpreg axis as the tow is bent. See FIG. 2. The present invention aligns the end effector 116 with the towpreg axis E (see FIG. 6) by using two cam followers 138 on a carriage 138a that can rotate to enable the alignment. With the two cam followers 138 following the involute path 120, the carriage 138a naturally rotates such that a line L--L (see FIGS. 4 and 6) between the centers of the followers 138 is approximately parallel to the tangent of the involute curve halfway between the followers 138. Then, by having the grip axis 118 oriented perpendicular to the drive shaft axis A, the grip axis 118 of the end effector 116 is always approximately coaxial with the towpreg axis during the entire bend. It is noted that the gripper 140 moves in a single degree of freedom (see lines F--F in FIG. 6), and acts in a plane initially normal to the towpreg axis E.

This alignment eliminates the kinks seen using the prior art bending apparatus of FIG. 1.

Figure 6:
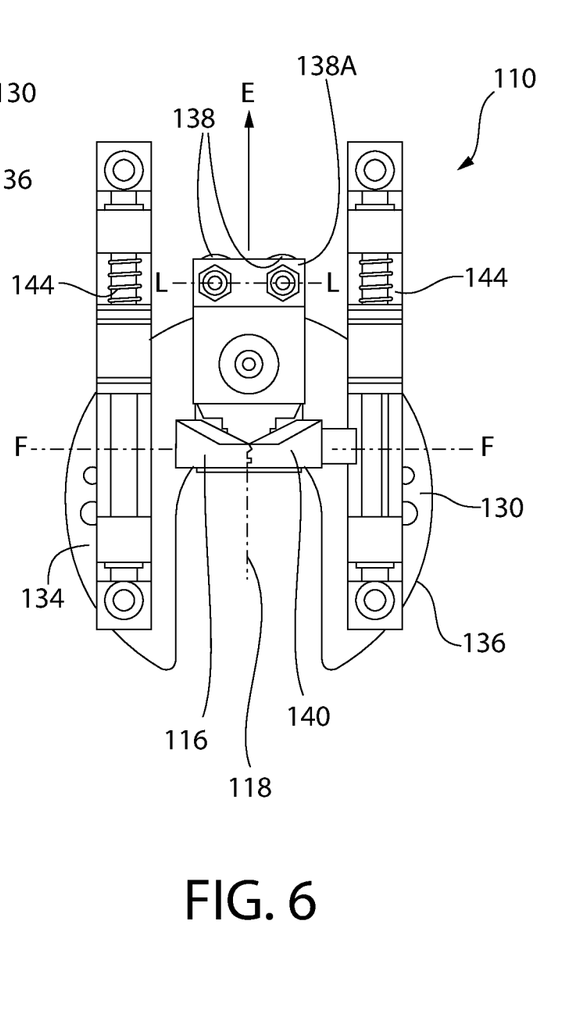
FIG. 6 is a partial bottom, plan view of the apparatus for bending towpreg of FIG. 2.

As the dual cam followers 138 travel along the involute cam surface 136, the end effector 116 translates along the axis E shown (see FIG. 6). The spring compliance of the spring or springs (biasing member or members 144) applies a force that pushes the cam followers 138 against the involute cam surface 136, enabling the end effector 116 to follow the involute path. The biasing members 144 are specified such that their applied force under displacement is small enough to not interfere with rotation, but large enough to ensure the forces generated during a bend do not overcome the spring forces, causing a divergence from the proper involute path and orientation resulting from followers 138 separating from surface 136.

Figure 7:
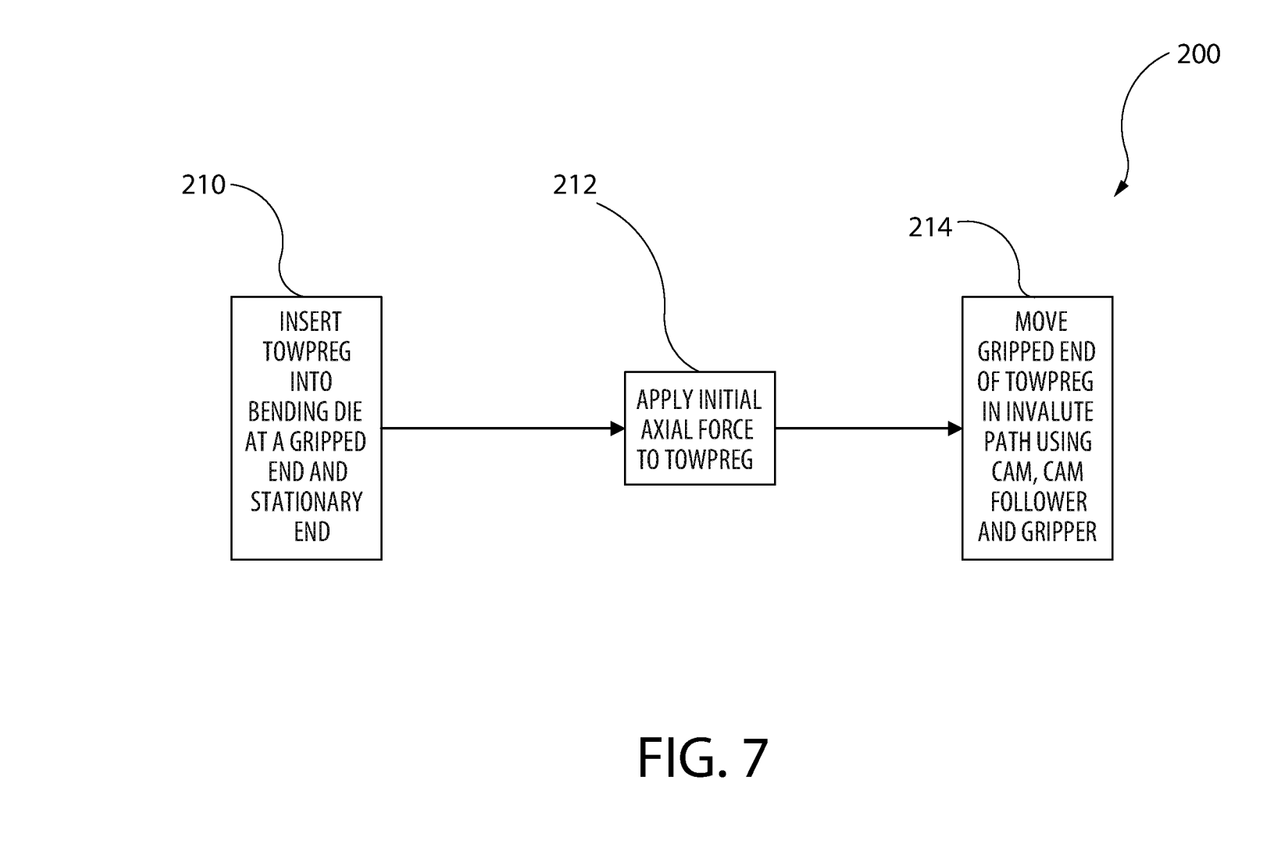
FIG. 7 is a flowchart of a method for bending towpreg to yield a desired amount of axial force during bending in accordance with an exemplary embodiment of the present invention.

The method 200 of the present invention will be described, which makes use of the bending apparatus 110 of the present invention, as described above. As shown in FIG. 7, the method for bending towpreg to maintain a desired amount of tension during bending includes inserting towpreg 112 into a bending die 114a, 114b having a bending die surface 115a, 115b (Step 210) and subsequently applying heat to the towpreg 112. Constraining the towpreg 112 prevents undesired deformation while the towpreg is hot. The towpreg 112 has a fixed, stationary end 146 and a gripped end 150. Zero tension (i.e., axial force) is applied to the towpreg 112 at the gripped end 150 (Step 212). The gripped end 150 of the towpreg 112 is moved in the involute path 120 (Step 214), thereby applying force to the towpreg achieved by displacement of the gripped end 150 along the involute cam surface 136. Axial force between the gripped end and the stationary end of the towpreg is maintained tangent to the bending die surface while bending the towpreg 112. By varying the amount of involution, the axial force can be increased or decreased as desired while bending. In some aspects, small amounts of axial compression can result in acceptable bends.

As can be seen in FIG. 2, the gripped end 150 of the towpreg 112 may be gripped by an end effector 116. The end effector 116 has a grip axis and the towpreg has a longitudinal axis at its gripped end (that effectively moves during bending). Alignment of the grip axis and the longitudinal axis of the towpreg 112 is maintained during bending.

For comparative context, all three mechanisms (present invention, SCARA, and constant radius) operate in a common reference frame. Bending occurs in the XY plane, with the major axis of the towpreg feed defining zero degrees (axis Y--Y of FIGS. 1 and 2). Defining left or right bends as positive or negative is arbitrary, provided the definition is consistent across all mechanisms.

The die and end effector axes of rotation are all normal to the XY bending plane, and the distances between these centers and the grip point lie in the XY plane. The die is static, forming towpreg about either of its rotational centers, while the end effector is dynamic, rotating about driveshaft axis A while gripping towpreg.

Further, all three share an end effector design in which a gripper actuates to hold the towpreg as rotation occurs about the end effector center. The gripper has a single degree of freedom, and acts in a plane initially normal to the towpreg feed axis.

During bending, the gripper actuation (line F--F of FIG. 6) remains normal to the outgoing side of the towpreg, while transitioning to an acute angle relative to the incoming towpreg. The angle formed between the gripping actuation line and towpreg axis is complementary to the displacement angle of the initial plane upstream of the bending dies 114a, 114b.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus for bending towpreg to form a preform, comprising:
   (a) at least one bending die disposed in a fixed position;
   (b) an involute cam mechanism, comprising:
      (i) a drive shaft rotatable about a drive shaft axis;
      (ii) a cam disposed on the drive shaft, the cam having a cam surface;
      (iii) at least one cam follower, said at least one cam follower following an involute cam path around the cam, said cam follower biased against the cam by a biasing member;
      (iv) the cam surface providing for movement of the cam follower in an involute path;
   (c) a gripper disposed on the cam follower, said gripper for gripping a first end of the towpreg
   (d) a clamp for fixing a second end of the towpreg adjacent to the bending die, and fixed relative to the first end of the towpreg.

2. The apparatus for bending towpreg of claim 1, wherein the at least one follower is dual followers.

3. The apparatus for bending towpreg of claim 1 wherein the at least one bending die is heated.

4. The apparatus for bending towpreg of claim 1 wherein the biasing member is a spring.

5. The apparatus for bending towpreg of claim 1, wherein an axial force applied by the gripper is a tensile force.

6. The apparatus for bending towpreg of claim 1, wherein an axial force applied by the gripper is a compressive force.

7. The apparatus for bending towpreg of claim 1, wherein an axial force applied by the gripper increases during bending.

8. The apparatus for bending towpreg of claim 1, wherein axial force applied by the gripper decreases during bending.

9. The apparatus for bending towpreg of claim 1, wherein an axial force applied by the gripper remains constant during bending.

* * * * *